United States Patent [19]

Agano

[11] Patent Number: 5,502,465
[45] Date of Patent: Mar. 26, 1996

[54] IMAGE READING AND RECORDING APPARATUS USING A STIMULABLE PHOSPHOR SHEET AND A THERMOSENSITIVE RECORDING MEDIUM

[75] Inventor: Toshitaka Agano, Kanagawa, Japan

[73] Assignee: Fuji Photo Film Co., Ltd., Kanagawa, Japan

[21] Appl. No.: 22,276

[22] Filed: Feb. 25, 1993

[30] Foreign Application Priority Data

Feb. 27, 1992 [JP] Japan ................................... 4-041706

[51] Int. Cl.⁶ .............................. B41M 5/26; H01J 37/21
[52] U.S. Cl. .......................... 347/264; 347/172; 347/179
[58] Field of Search ..................... 250/311, 395; 372/23, 70, 80, 75, 39; 346/108, 160; 503/209, 225; 347/172, 179, 264

[56] References Cited

U.S. PATENT DOCUMENTS

| | | | |
|---|---|---|---|
| 4,270,095 | 5/1981 | Guch, Jr. et al. | 372/70 |
| 4,694,171 | 9/1987 | Hosoi et al. | 250/311 |
| 4,872,177 | 10/1989 | Baer et al. | 372/75 |
| 5,116,803 | 5/1992 | Hotta et al. | 503/209 |
| 5,119,389 | 6/1992 | Amano | 372/23 |

Primary Examiner—Benjamin R. Fuller
Assistant Examiner—Raquel Yvette Gordon
Attorney, Agent, or Firm—Sughrue, Mion, Zinn, Macpeak & Seas

[57] ABSTRACT

An image reading and recording apparatus has a first feed system for feeding an image-bearing sheet with image information recorded thereon to an image reading and recording device, and a second feed system for feeding a thermosensitive recording sheet to the image reading and recording device, the thermosensitive recording sheet having a support coated with a coloring agent, a color developer, and light-absorbing dyes, the thermosensitive recording sheet being capable of producing a color whose density depends on the thermal energy of a laser beam irradiated thereto. An optical laser beam scanning system scans the image-bearing sheet and the thermosensitive recording sheet with a laser beam in a main scanning direction while the image-bearing sheet and the thermosensitive recording sheet are fed in an auxiliary scanning direction in the image reading and recording means, to read the image information from the image-bearing sheet and record image information on the thermosensitive recording sheet. A photomultiplier converts the optical information read from the image-bearing sheet into an electric signal.

12 Claims, 7 Drawing Sheets

IMAGE READING AND RECORDING APPARATUS USING A STIMULABLE PHOSPHOR SHEET AND A THERMOSENSITIVE RECORDING MEDIUM

BACKGROUND OF THE INVENTION

1. Field of the Invention

The present invention relates to an image reading and recording apparatus for reading image information from an image-bearing sheet on which the image information has been recorded, and recording the image information thus read on a thermosensitive recording sheet.

2. Description of the Related Art

There is known an image reading apparatus for scanning an image-bearing sheet on which the image information has been recorded with a laser beam to optically read the image information, and converting the optical image information into an electric signal with a photoelectric transducer such as a CCD, a photomultiplier, or the like. There is also known an image recording apparatus for scanning a recording sheet such as a photographic film or the like with an intensity-modulated laser beam to record image information on the recording sheet.

Such image reading and recording apparatuses employ substantially identical optical scanning systems for applying a scanning laser beam to the image-bearing sheet and the recording sheet. Therefore, there has been proposed a combined image reading and recording apparatus which is rendered relatively small and economical by employing a common optical laser beam scanning system for generating a scanning laser beam (see Japanese laid-open patent publication No. 64-533 for details).

If recording sheets supplied to such a proposed image reading and recording apparatus are silver-salt photographic films, however, an image developing apparatus is additionally required to develop image information with a developing liquid after the image information has been recorded on a recording sheet.

SUMMARY OF THE INVENTION

It is the object of the present invention to provide an image reading and recording apparatus in which a thermosensitive recording sheet can be used without requiring an image developing apparatus, which is relatively small and economical.

According to the present invention, there is provided an image reading and recording apparatus comprising image reading and recording means for reading and recording image information, first feed means for feeding an image-bearing sheet with image information recorded thereon to the image reading and recording means, second feed means for feeding a thermosensitive recording sheet having a support coated with a coloring agent, a color developer and light-absorbing dyes, which is capable of producing a color whose density depends on the thermal energy of a laser beam applied thereto, an optical laser beam scanning system for scanning the image-bearing sheet or the thermosensitive recording sheet with a laser beam in a main scanning direction while the image-bearing sheet or the thermosensitive recording sheet is being fed in an auxiliary scanning direction in the image reading and recording means, to read optical information based on the image information from the image-bearing sheet or record image information on the thermosensitive recording sheet, and photoelectric converting means for converting the optical information read from the image-bearing sheet into an electric signal.

The image-bearing sheet may be a stimulable phosphor sheet having a phosphor layer for storing radiation image information and emitting light representing the stored radiation image information upon exposure to a stimulating radiation.

The image-bearing sheet is fed to the image reading and recording means by the first feed means. In the image reading and recording medium, the image-bearing sheet is scanned by the laser beam from the optical laser beam scanning system, and optical information read from the image-bearing sheet is converted into an electric signal by the photoelectric converting means. Then, the thermosensitive recording medium is fed to the image reading and recording means by the second feed means. In the image reading and recording means, the thermosensitive recording medium is scanned with the laser beam from the optical laser beam scanning system that is intensity-modulated by the electric signal. The thermosensitive recording sheet generates a color whose density depends on the thermal energy of the laser beam irradiated thereto, thus recording an image thereon.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Like or corresponding parts are denoted by like or corresponding reference numerals throughout views.

A thermosensitive recording sheet for use in the image reading and recording apparatus according to the present invention is a thermosensitive recording medium developed by the applicant. The applicant has applied for patents on the thermosensitive recording medium that is capable of recording images of high quality. The thermosensitive recording medium comprises a support coated with leuco dye, a color developer, and light-absorbing dyes, and produces a color whose density depends on the thermal energy that is applied to the thermosensitive recording medium. For further details, reference should be made to Japanese patent applications Nos. 3-62684 and 3-187494.

The thermosensitive recording medium has a thermosensitive layer on the support. The thermosensitive layer is produced by coating a coating solution on the support. The coating solution contains an emulsion which is prepared by dissolving thermally fusible microcapsules containing at least leuco dye, a color developer, and light-absorbing dyes into an organic solvent that is either slightly water-soluble or water-insoluble, and then emulsifying and dispersing the dissolved materials.

The leuco dye produces a color by donating electrons or accepting protons from an acid or the like. The basic dye precursor comprises a compound which is normally substantially colorless and has a partial skeleton of lactone, lactam, sultone, spiropyran, ester, amide, or the like, which can be split or cleaved upon contact with the color developer. Specifically, the compound may be crystal violet lactone, benzoil leucomethylene blue, malachite green lactone, rhodamine B lactam, 1,3,3-trimethyl- 6'-ethyl-8'-butoxyindolino-benzospiropyran, or the like.

The color developer for the leuco dye may be of an acid substance such as a phenolic compound, an organic acid or its metal salt, oxybenzoate, or the like. The color developer should preferably have a melting point ranging from 50° C. to 250° C. Particularly, it should be of a slightly water-soluble phenol or organic acid having a melting point ranging from 60° C. to 200° C. Specific examples of the color developer are disclosed in Japanese laid-open patent publication No. 61-291183.

The light-absorbing dyes should preferably comprise dyes which absorb less light in a visible spectral range and have a particularly high rate of absorption of radiation whose wavelengths are in an infrared spectral range. Examples of such dyes are cyanine dyes, phthalocyanine dyes, pyrylium and thiopyrylium dyes, azulenium dyes, squarylium dyes, metal complex dyes containing Ni, Cr, etc., naphtoquinone and anthraquinone dyes, indophenol dyes, indoaniline dyes, triphenylmethane dyes, triallylmethane dyes, aminium and diimmonium dyes, nitroso compounds, etc.

The image reading and recording apparatus according to the present invention will be described in detail with reference to FIGS. 1 through 7.

Figure 1:
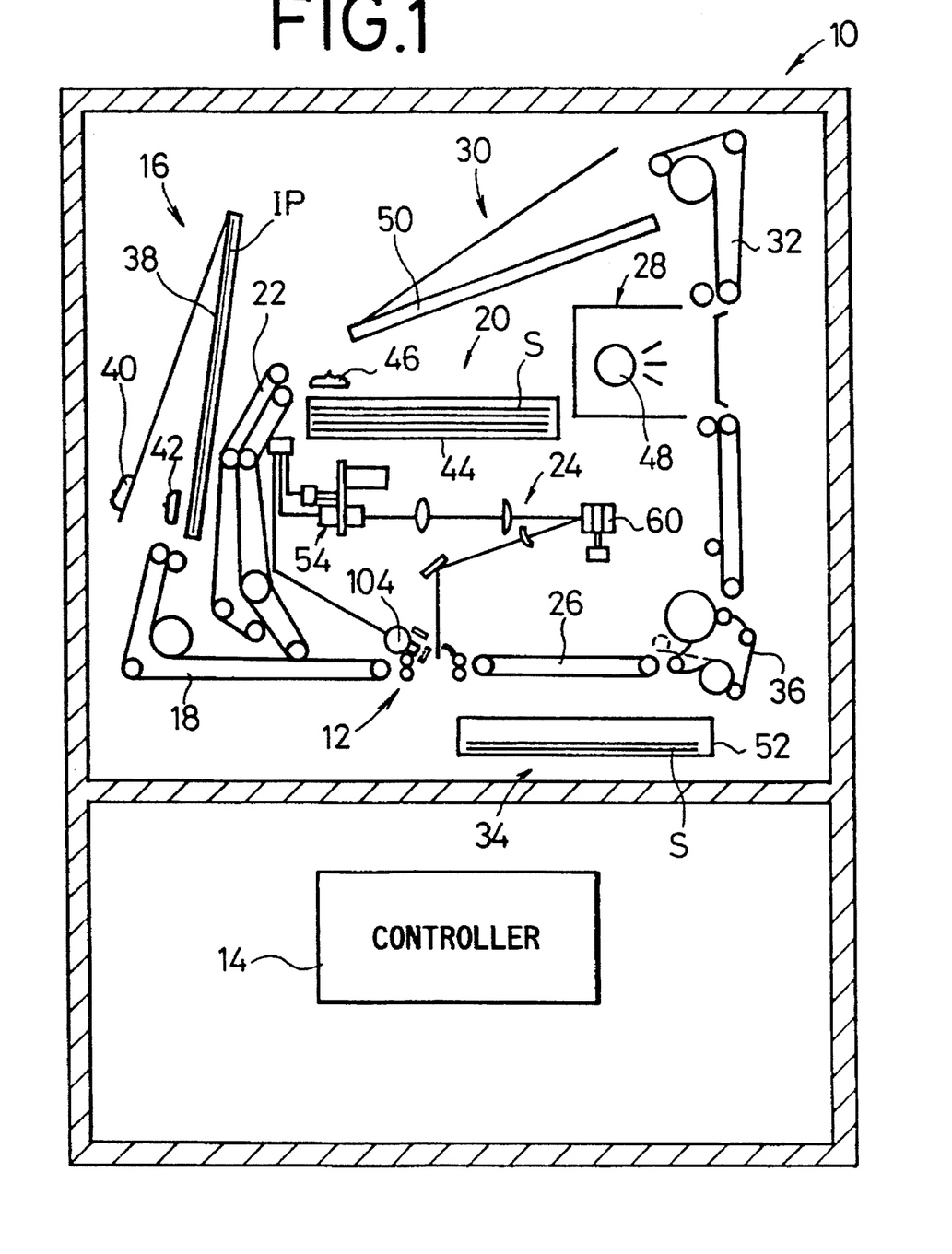
FIG. 1 is a schematic vertical cross-sectional view of an embodiment of the image reading and recording apparatus according to the present invention.

As shown in FIG. 1, the image reading and recording apparatus according to the present invention is embodied in a radiation image reading and recording system 10. The radiation image reading and recording system 10 reads radiation image information recorded on a stimulable phosphor sheet IP, and records the radiation image information thus read on a thermosensitive recording sheet S. The thermosensitive recording sheet S is the thermosensitive recording medium of the type described above. The operation of the radiation image reading and recording system 10 is controlled by a controller 14.

When a certain phosphor in the stimulable phosphor sheet IP is exposed to a radiation such as X-rays, α-rays, β-rays, γ-rays, cathode rays, ultraviolet rays, etc., the phosphor stores a part of the energy of the radiation. When the phosphor exposed to the radiation is then exposed to stimulating rays such as visible light, etc., the phosphor emits light in proportion to the stored energy. The stimulable phosphor sheet IP is made of such a phosphor which is either in the form of a sheet or a layer coated on a sheet. After light emitted from the stimulable phosphor sheet IP in response to stimulating rays is photoelectrically read, erasing light is applied to the stimulable phosphor sheet IP to erase residual radiation image information from the stimulable phosphor sheet IP to make it reusable.

The radiation image reading and recording system 10 comprises a stimulable phosphor sheet supply unit 16 for supplying the stimulable phosphor sheet IP with radiation image information recorded thereon, a first feed system (first feed means) 18 for feeding the stimulable phosphor sheet IP to an image reading and recording device 12, a thermosensitive recording sheet supply unit 20 for supplying the thermosensitive recording sheet S to record radiation image information thereon, a second feed system (second feed means) 22 for feeding the thermosensitive recording sheet S to the image reading and recording device 12, an optical laser beam scanning system 24 for applying a laser beam $L_1$ or $L_2$ to the stimulable phosphor sheet IP or the thermosensitive recording sheet S, a third feed system 26 for feeding the stimulable phosphor sheet IP or the thermosensitive recording sheet S from the image reading and recording device 12, an erasing unit 28 for erasing residual image information from the stimulable phosphor sheet IP, a stimulable phosphor sheet storage unit 30 for storing the stimulable phosphor sheet IP from which residual image information has been erased, a fourth feed system 32 for feeding the stimulable phosphor sheet IP from the third feed system 26 through the erasing unit 28 to the stimulable phosphor sheet storage unit 30, a thermosensitive recording sheet storage unit 34 for storing the thermosensitive recording sheet S on which the radiation image information has been recorded, and a fifth feed system 36 for feeding the thermosensitive recording sheet S from the third feed system 26 to the thermosensitive recording sheet storage unit 34.

The stimulable phosphor sheet supply unit 16 is loaded with a cassette 38 that accomodates a single stimulable phosphor sheet IP with radiation image information recorded thereon. A lid of the cassette 38 can be opened by a first suction mechanism 40, and the stimulable phosphor sheet IP can be taken out of the cassette 38 by a second suction mechanism 42. The thermosensitive recording sheet supply unit 20 is loaded with a magazine 44 storing a plurality of thermosensitive recording sheets S. The thermosensitive recording sheets S can be taken, one by one, out of the magazine 44 by a suction mechanism 46. The erasing unit 28 has an erasing light source 48 such as a halogen lamp, a sodium vapor lamp, or the like. The stimulable phosphor sheet storage unit 30 is loaded with a cassette 50 that accomodates a single reusable stimulable phosphor sheet IP. The thermosensitive recording sheet storage unit 34 is loaded with a magazine 52 storing a plurality of thermosensitive recording sheets S each with radiation image information recorded thereon. The fifth feed system 36 can swing between solid- and broken-line positions shown in FIG. 1 to connect the third feed system 26 selectively to the fourth feed system 32 or to the thermosensitive recording sheet storage unit 34.

Figure 2:
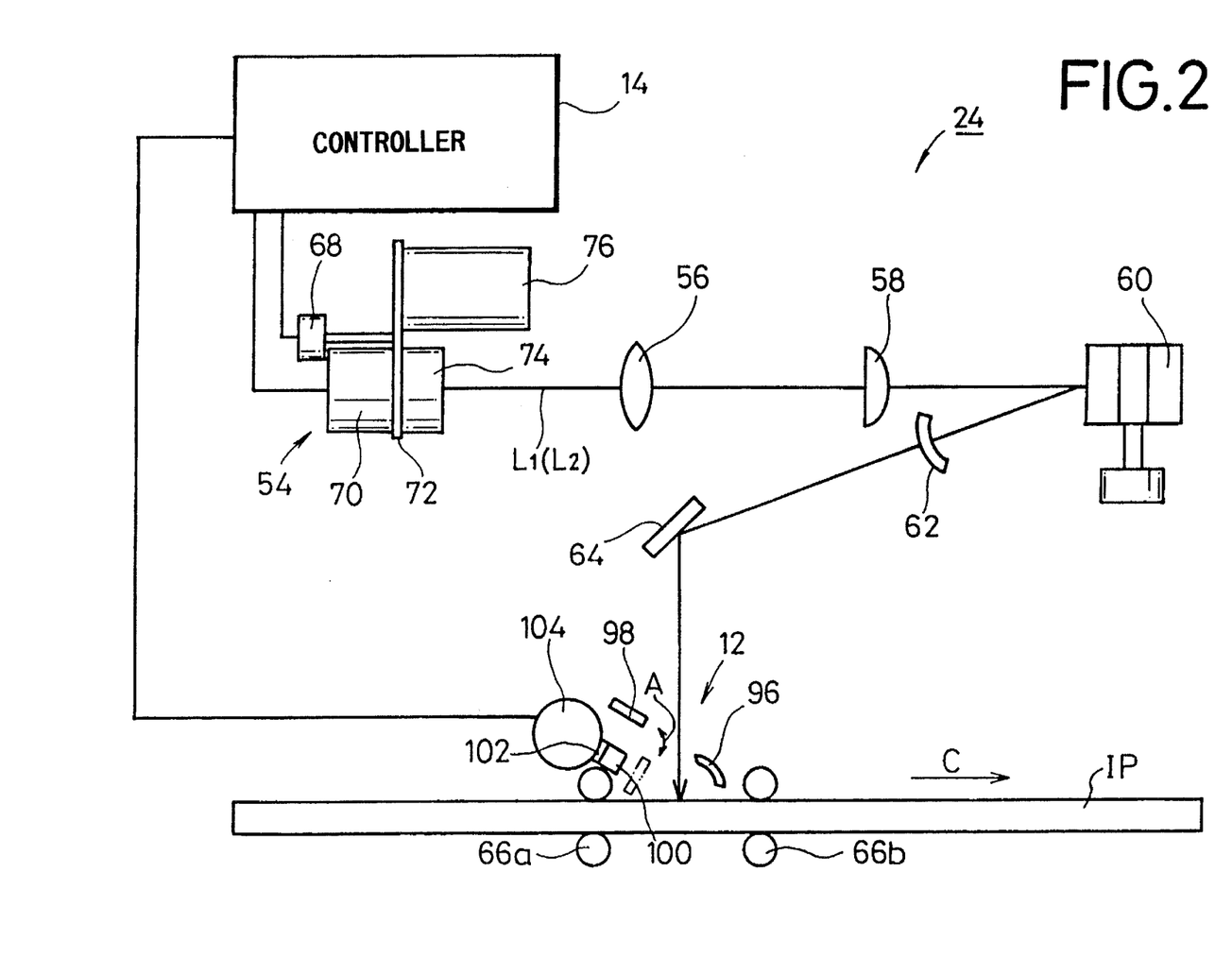
FIG. 2 is an enlarged schematic cross-sectional view of an optical laser beam scanning system in the image reading and recording apparatus shown in FIG. 1.

As shown in FIG. 2, the optical laser beam scanning system 24 has a laser beam generator 54 for selectively emitting the laser beam $L_1$ or $L_2$ each having a different wavelength. The laser beam $L_1$ or $L_2$ emitted by the laser beam generator 54 is guided to a polygonal mirror 60 through a collimator lens 56 and a cylindrical lens 58. The laser beam $L_1$ or $L_2$ is reflected and deflected by the polygonal mirror 60 passing through an fθ lens 62 and is then reflected by a cylindrical mirror 64 to an area between two spaced pairs of nip rollers 66a, 66b in the image reading and recording device 12.

Figure 3:
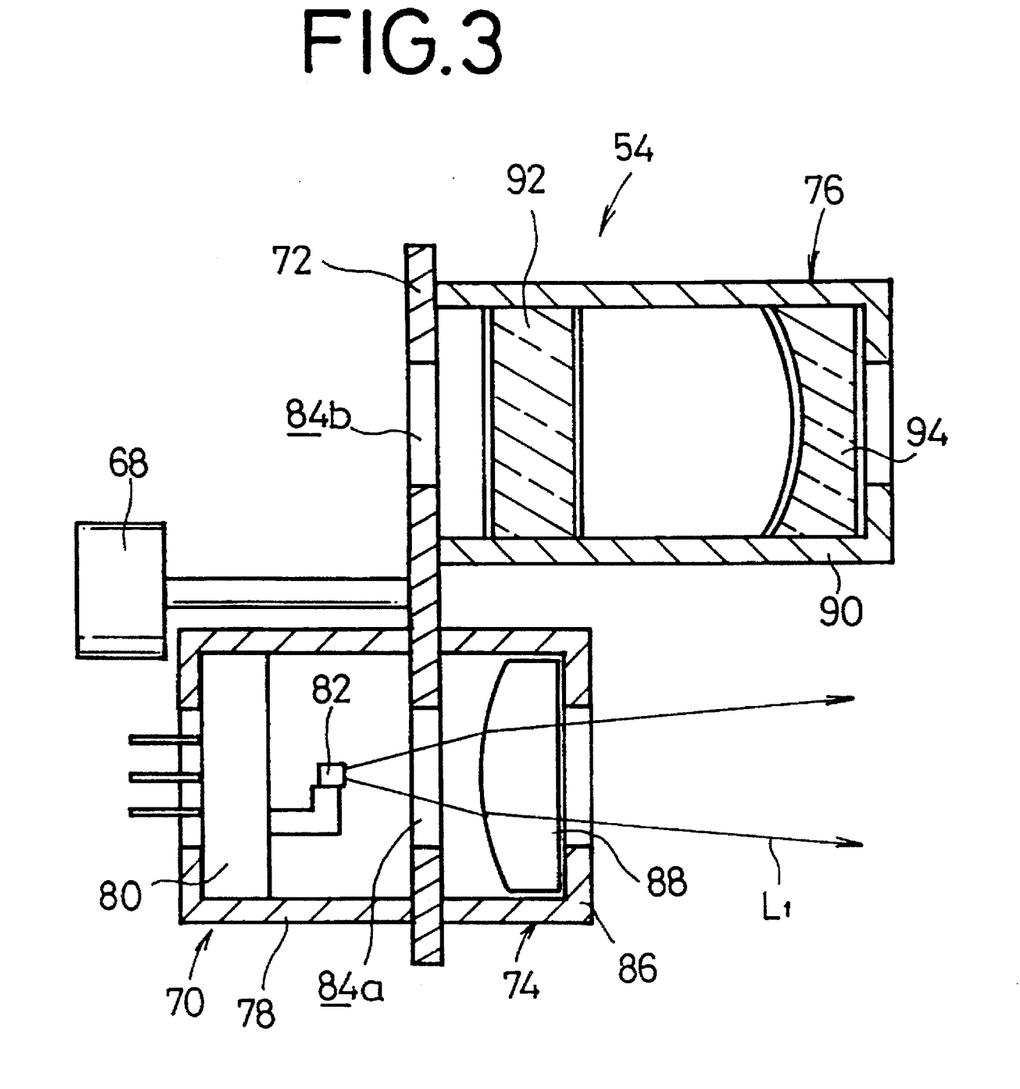
FIG. 3 is an enlarged cross-sectional view of a laser beam generator in the optical laser beam scanning system shown in FIG. 2.

As shown in FIG. 3, the laser beam generator 54 comprises a laser beam emitting unit 70 for emitting the laser beam $L_1$, a turn plate 72 rotated by a motor 68, a condensing unit 74 for condensing the laser beam $L_1$, and a wavelength converter 76 for converting the laser beam $L_1$ into the laser beam $L_2$ that has a different wavelength from the wavelength of the laser beam $L_1$. The laser beam emitting unit 70 has a laser diode 82 fixed to a mount 80 in a casing 78. The laser diode 82 emits the laser beam $L_1$, which has a wavelength of 810 nm. The condensing unit 74 comprises a condensing lens 88 housed in a casing 86 fixed to the turn plate 72 over a first opening 84a defined therein. The wavelength converter 76 has a casing 90 fixed to the turn plate 72 over a second opening 84b defined therein. The casing 90 houses a $YVO_4$ rod 92 comprising a solid laser medium doped with neodymium (Nd) (hereinafter referred to as "Nd:$YVO_4$ rod 92"), and a resonator mirror 94. The wavelength converter 76 converts the laser beam $L_1$ into the laser beam $L_2$ which has a wavelength of 1064 nm.

The image reading and recording device 12 has a reflecting mirror 96 near the pair of nip rollers 66b. The reflecting mirror 96 is coated with a coating whose reflectance with respect to light emitted by the stimulable phosphor sheet IP is higher than with respect to other light which is primarily infrared radiation. The image reading and recording device 12 also has a shutter 98, a light guide 100, a filter 102, and a photomultiplier (photoelectric converting means) 104 near the other pair of nip rollers 66a.

Figure 4:
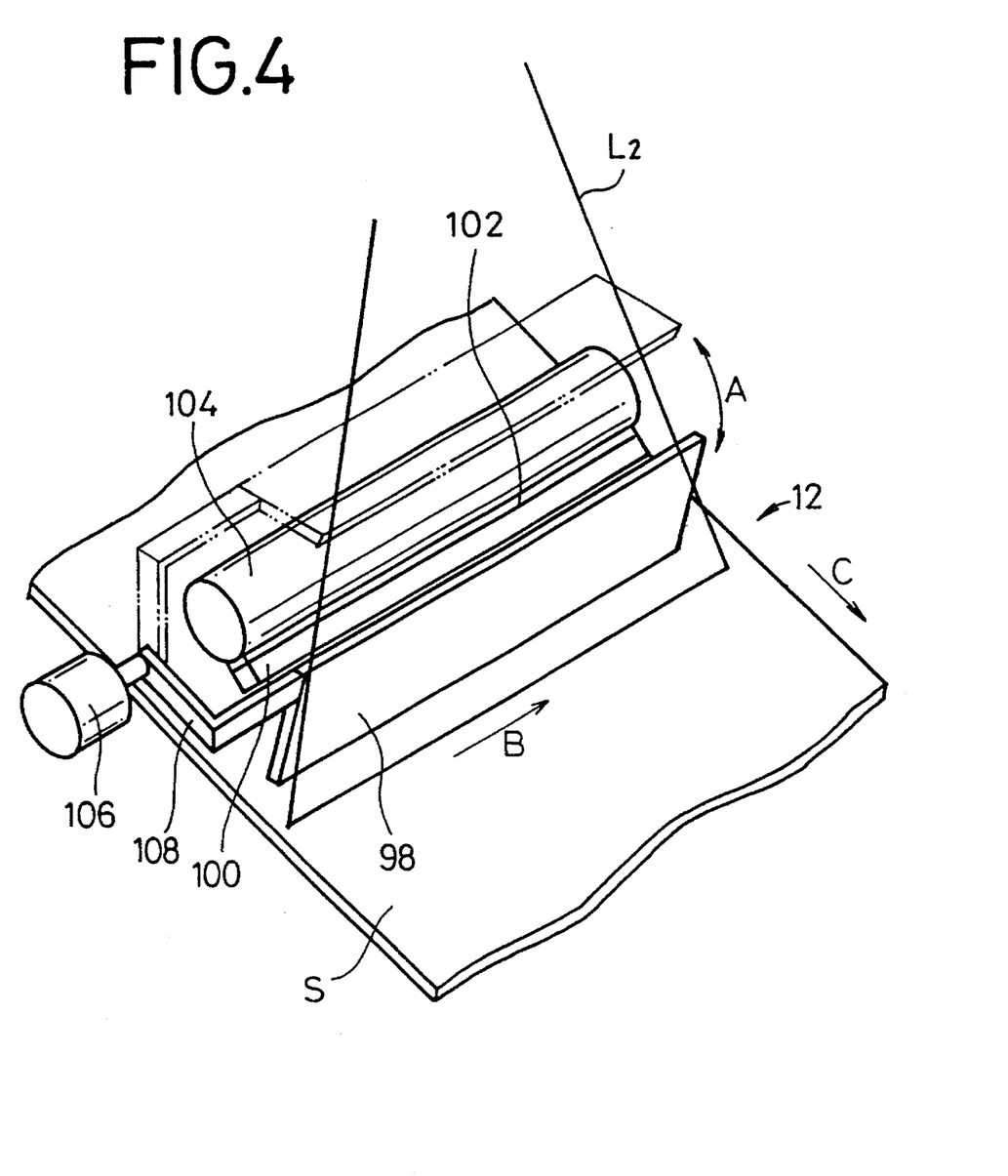
FIG. 4 is a perspective view of an image information reading and recording device in the image reading and recording apparatus shown in FIG. 1.
Figure 5:
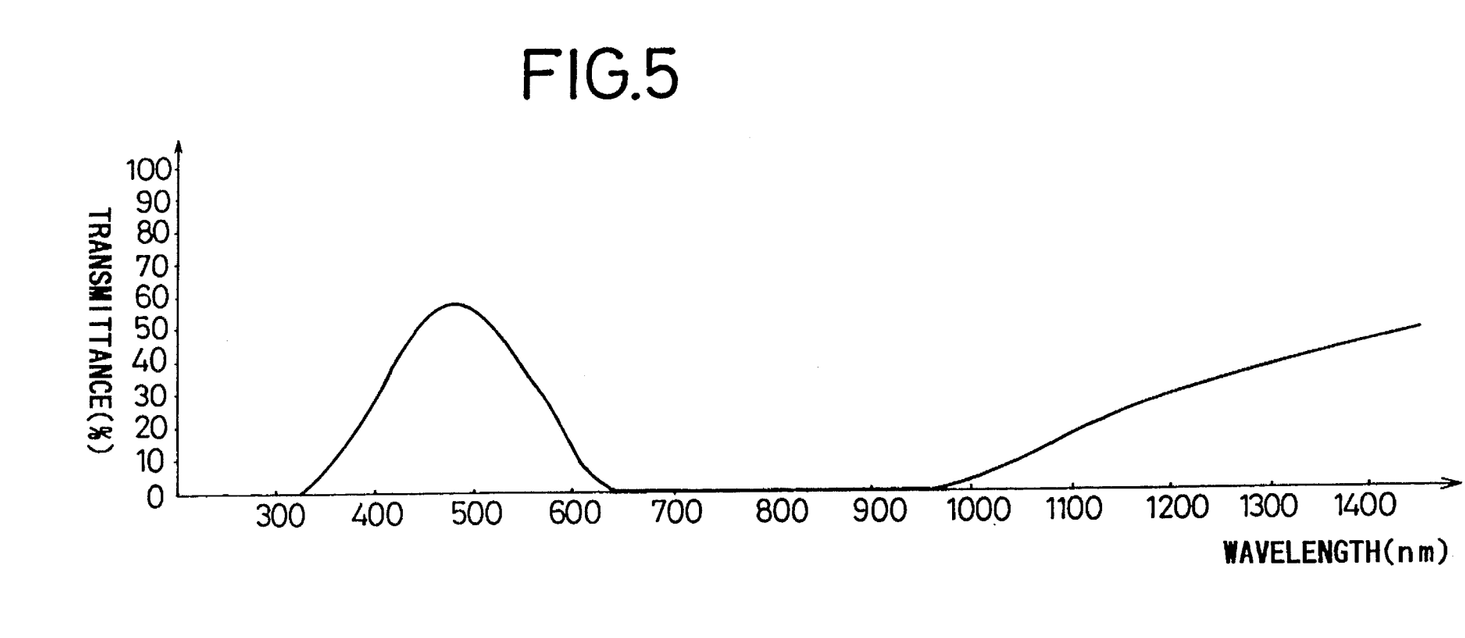
FIG. 5 is a graph showing characteristics of a filter in the image information reading and recording device shown in FIG. 4.

As shown in FIG. 4, the photomultiplier 104 is in the form of an elongate cylinder having a photoelectric converting array extending along a circumferential surface thereof. Light emitted by the stimulable phosphor sheet IP is guided to the photoelectric converting array of the photomultiplier 104 through the light guide 100. The filter 102 has characteristics such that it cuts light in the wavelength range of the laser beam $L_1$, and passes light in the wavelength range of the light emitted by the stimulable phosphor sheet IP. The filter 102 may be B480 filter manufactured by Hoya Corporation, for example. As shown in FIG. 5, the B480 filter has a high transmittance in a wavelength range near 480 nm and cuts light in a wavelength range near 800 nm. The shutter 98 serves to prevent the infrared radiation primarily of the laser beam $L_2$ from being applied to the photomultiplier 104. The shutter 98 is coupled at one end to a crank 108 connected to the output shaft of a motor 106 that is positioned adjacent to one end of the photomultiplier 104. When the motor 106 is energized, the shutter 98 can be angularly retracted from a solid-line position in front of the light guide 100 into an imaginary-line position above the photomultiplier 104 in the direction indicated by the arrow A (FIG. 4).

Operation of the radiation image information reading and recording apparatus 10 will be described below.

Radiation image information recorded on the stimulable phosphor sheet IP is read by the radiation image information reading and recording apparatus 10 as follows:

The cassette 38 accomodating the stimulable phosphor sheet IP on which radiation image information of a subject such as a human body is recorded is loaded in the stimulable phosphor sheet supply unit 16. In the stimulable phosphor sheet supply unit 16, the lid of the cassette 38 is opened by the first suction mechanism 40, and then the stimulable phosphor sheet IP is attracted by the second suction mechanism 42 and supplied to the first feed system 18, which feeds the stimulable phosphor sheet IP to the image reading and recording device 12. In the image reading and recording device 12, the image information recorded on the stimulable phosphor sheet IP is read by the optical laser beam scanning system 24.

At this time, as shown in FIG. 3, the condensing unit 74 is positioned in alignment with the laser beam emitting unit 70. The controller 14 controls the laser beam emitting unit 70 to emit the laser beam $L_1$ of the wavelength of 810 nm from the laser diode 82. The emitted laser beam $L_1$ travels through the condensing lens 88 to the collimator lens 56, by which it is converted into a parallel laser beam. The laser beam $L_1$ is then irradiated through the cylindrical lens 58 to the polygonal mirror 60. The polygonal mirror 60, which is rotating at high speed, reflects and deflects the laser beam $L_1$, which is guided by the fθ lens 62 and the cylindrical mirror 64 to the stimulable phosphor sheet IP to scan the stimulable phosphor sheet IP in a main scanning direction indicated by the arrow B (FIG. 4) while it is being fed by the nip rollers 66a, 66b in an auxiliary scanning direction indicated by the arrow C (FIG. 2).

Upon exposure to the laser beam $L_1$, whose wavelength is 810 nm, the stimulable phosphor sheet IP emits light representing the radiation image information recorded thereon. The emitted light is directly applied to the light guide 100 and also reflected toward the light guide 100 by the reflecting mirror 96. The light is then guided to the photomultiplier 104 through the filter 102 by the light guide 100. The photomultiplier 104 converts the received light into an electric signal which indicates the image information recorded on the stimulable phosphor sheet IP. The filter 102, which has the transmittance characteristics as shown in FIG. 5, blocks the laser beam $L_1$ from being applied to the photomultiplier 104, and passes only the emitted light from the stimulable phosphor sheet IP to the photomultiplier 104.

The stimulable phosphor sheet IP from which the image information has been read is then directed toward the erasing unit 28 by the third feed system 26, the fifth feed system 36, and the fourth feed system 32. In the erasing unit 28, erasing light emitted by the erasing light source 48 is applied to the stimulable phosphor sheet IP to erase residual image information therefrom. Thereafter, the stimulable phosphor sheet IP is delivered into the cassette 50 in the stimulable phosphor sheet storage unit 30 by the fourth feed system 32 for reuse.

The radiation image information read from the stimulable phosphor sheet IP is recorded on the thermosensitive recording sheet S by the radiation image information reading and recording apparatus 10 as follows:

Prior to the recording process, the motor 68 (FIG. 3) of the laser beam generator 54 is energized to rotate the turn plate 72 to bring the wavelength converter 76 into alignment with the laser beam emitting unit 70. the motor 106 of the image reading and recording device 12 is also energized to lower the shutter 98 into the position in front of the light guide 100, i.e., between the light guide 100 and the thermosensitive recording sheet S, as shown in FIG. 4.

The suction mechanism 46 is actuated to attract the uppermost one of the thermosensitive recording sheets S stored in the thermosensitive recording sheet supply unit 20, and supply the thermosensitive recording sheet S to the second feed system 22. The second feed system 22 feeds the thermosensitive recording sheet S to the image reading and recording device 12, in which the radiation image information is recorded on the thermosensitive recording sheet S with the laser beam $L_2$ from the optical laser beam scanning system 24.

At this time, the laser diode 82 of the laser beam emitting unit 70 also emits the laser beam $L_1$ whose wavelength is 810 nm and which has been intensity-modulated based on the radiation image information under the control of the controller 14. The laser beam $L_1$ is then converted into the laser beam $L_2$ whose wavelength is 1064 nm by the Nd:YVO$_4$ rod 92 of the wavelength converter 76. The laser beam $L_2$ is outputted through the resonator mirror 94, and converted into a parallel laser beam by the collimator lens 56. The laser beam $L_2$ is then applied through the cylindrical lens 58 to the polygonal mirror 60, which reflects and deflects the laser beam $L_2$. The laser beam $L_2$ passes through the fθ lens 62 and is reflected by the cylindrical mirror 64 toward the thermosensitive recording sheet S. The laser beam $L_2$ now scans the thermosensitive recording sheet S in the main scanning direction B (FIG. 4) while it is being fed by the nip rollers 66a, 66b in the auxiliary scanning direction C.

The light-absorbing dyes of the thermosensitive recording sheet S are heated by absorption of the laser beam $L_2$ whose wavelength is 1064 nm, and the radiation image information is recorded on the thermosensitive recording sheet S with the thermal energy thus generated. Part of the laser beam $L_2$ is reflected toward the light guide 100 by the thermosensitive recording sheet S, and would pass through the filter 102 toward the photomultiplier 104. However, since the shutter 98 is positioned in front of the light guide 100, the laser beam $L_2$ in the infrared spectral range is prevented from being applied to the photomultiplier 104, which is therefore protected from damage.

The thermosensitive recording sheet S with the recorded image is then delivered to the fifth feed system 36 by the third feed system 26. The fifth feed system 36 is angularly displaced into the broken-line position (FIG. 1) to deliver the thermosensitive recording sheet S into the magazine 52 in the thermosensitive recording sheet storage unit 34.

In the above embodiment, the single radiation image reading and recording apparatus 10 can both read and record image information, and no image developing process is required after the image has been recorded on thermosensitive recording sheet S.

In the above embodiment, the condensing unit 74 and the wavelength converter 76 can selectively be brought into alignment with the laser beam emitting unit 70 for generating the image reading laser beam $L_1$ whose wavelength is 810 nm and the image recording laser beam $L_2$ whose wavelength is 1064 nm.

Figure 6:
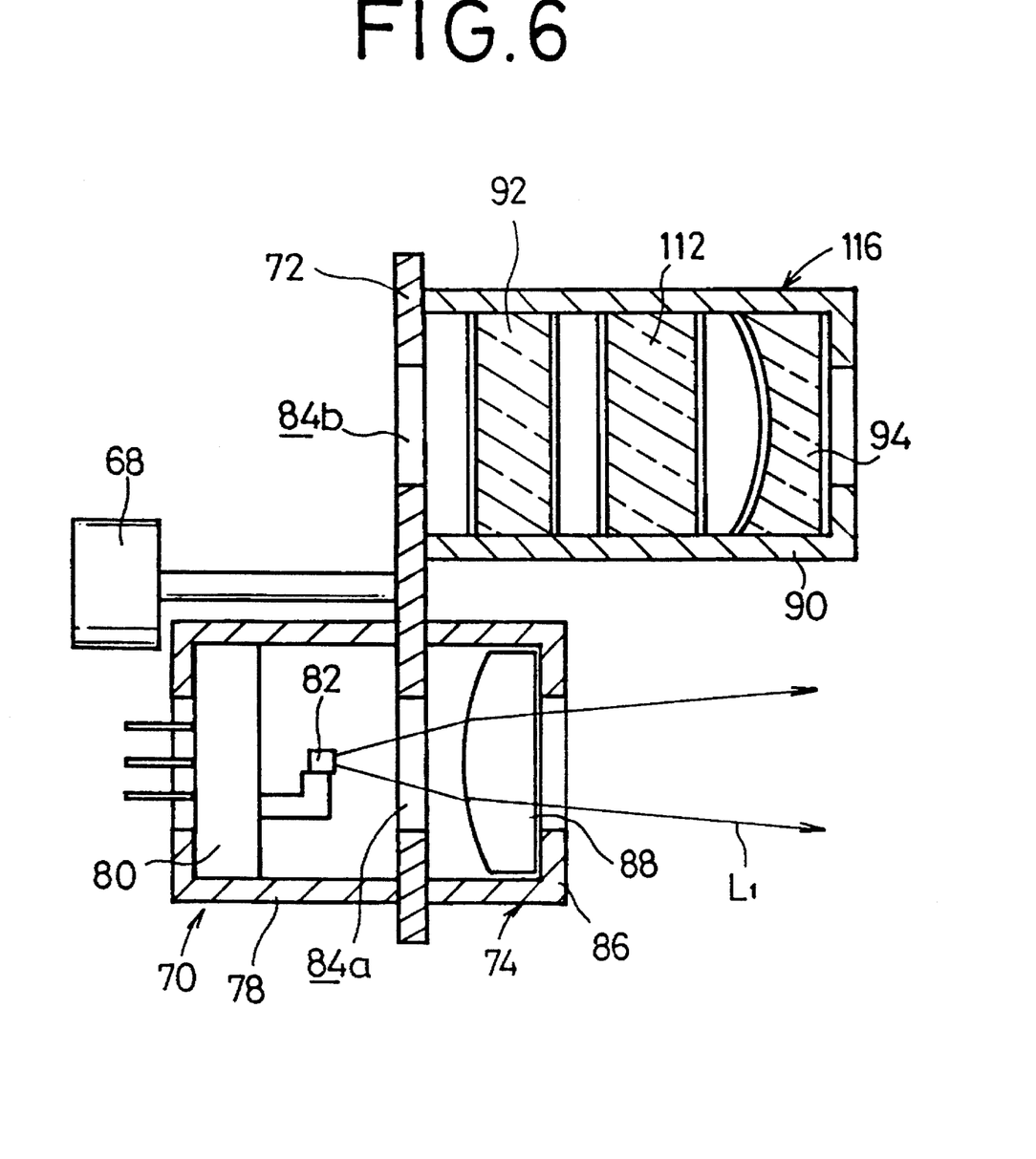
FIG. 6 is an enlarged cross-sectional view of a laser beam generator according to another embodiment of the present invention.

FIG. 6 shows a laser beam generator according to another embodiment of the present invention. The laser beam generator shown in FIG. 6 has a wavelength converter 116 composed of the Nd:YVO$_4$ rod 92 combined with a K.TiO.PO$_4$ element (KTP element) 112 and the resonator mirror 94, and the condensing unit 74. The wavelength converter 116 can be brought into alignment, instead of the condensing unit 74, with the laser beam emitting unit 70 for generating a reading laser beam whose wavelength in 532 nm, which is the second harmonic of the laser beam $L_2$ emitted by the wavelength converter 116. The laser beam $L_1$ whose wavelength is 810 nm emitted by the laser diode 82 is used as a recording laser beam.

Figure 7:
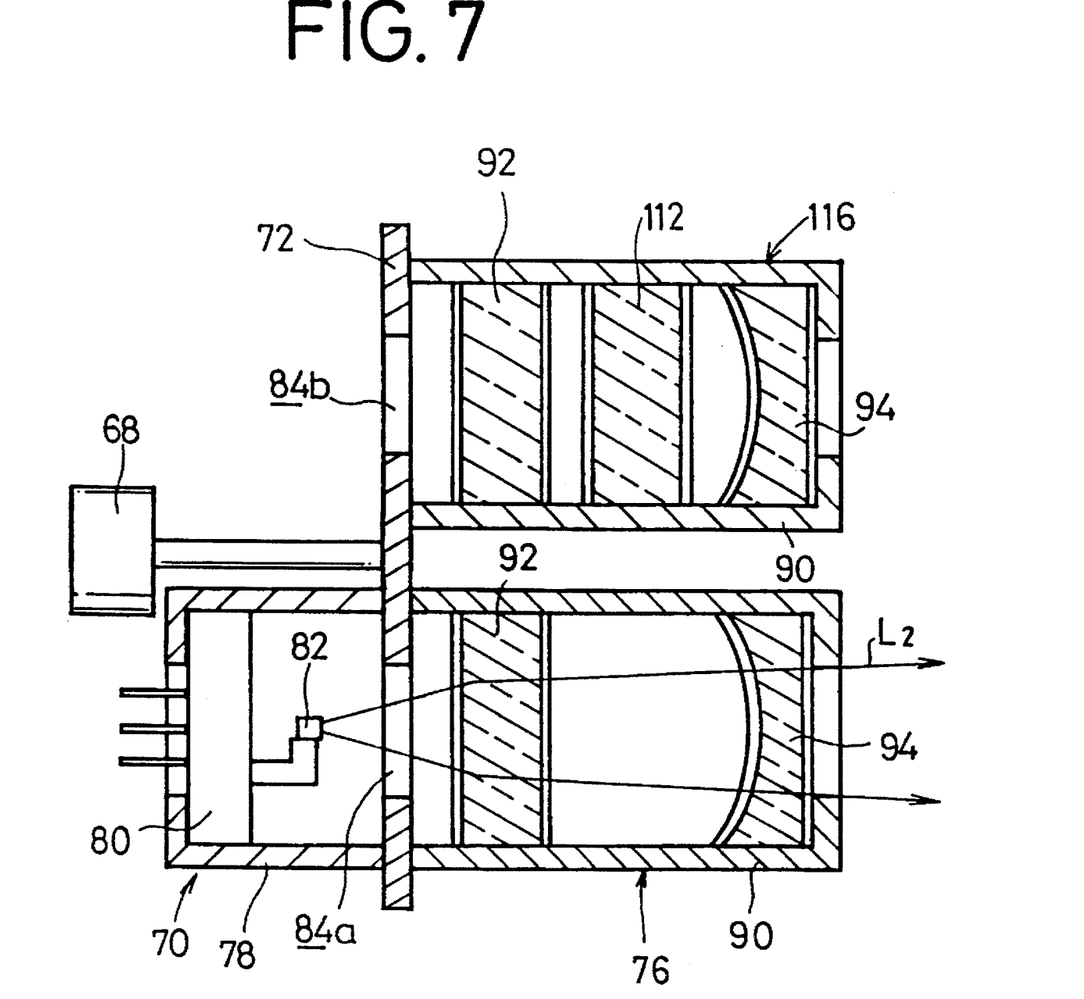
FIG. 7 is an enlarged cross-sectional view of a laser beam generator according to still another embodiment of the present invention.

FIG. 7 shows a laser beam generator according to still another embodiment of the present invention. The laser beam generator shown in FIG. 7 has the wavelength converter 116 shown in FIG. 6 and the wavelength converter 76 shown in FIG. 3, which can selectively be brought into alignment with the laser beam emitting unit 70 for generating a reading laser beam having a wavelength of 532 nm and a recording laser beam having a wavelength of 1064 nm.

Since the wavelength converters 76, 116 employ identical Nd:YVO$_4$ rods 92 and identical resonator mirrors 94, only the KTP element 112 may be brought into and out of alignment with the laser beam emitting unit 70.

If the stimulating radiation capable of causing the stimulable phosphor sheet IP to emit light and the radiations that can be absorbed by the light-absorbing dyes of the thermosensitive recording sheet S have wavelengths in the same range, then the wavelength converters 76, 116 may be dispensed with, and the image information can be read from the stimulable phosphor sheet IP and recorded on the thermosensitive recording sheet S with the laser beams having the same wavelength. The image information may be read from the stimulable phosphor sheet IP with both a laser beam whose wavelength is about 680 nm, for example, to which the stimulable phosphor sheet IP is sensitive, and a laser beam whose wavelength ranges from 780 nm to 860 nm which is effective to heat the stimulable phosphor sheet IP for increased sensitivity, and the image information may be recorded on the thermosensitive recording sheet S with the laser beam whose wavelength ranges from 780 nm to 860 nm.

The image reading and recording apparatus according to the present invention offers the following advantages:

The common optical laser beam scanning system is employed to read image information recorded on a sheet on which it has been recorded and record image information on a thermosensitive recording sheet. Therefore, the image reading and recording apparatus is made relatively small in size and economical. Since the thermosensitive recording sheet comprises a thermosensitive recording medium that comprises a support coated with a coloring agent, a color developer, and light-absorbing dyes, and produces a color whose density depends on the thermal energy that is applied to the thermosensitive recording medium, no image developing process is needed after the image information is recorded. This also contributes to reduction in the size and cost of the image reading and recording apparatus.

Although certain preferred embodiments of the present invention have been shown and described in detail, it should be understood that various changes and modifications may be made therein without departing from the scope of the appended claims.

What is claimed is:

1. An image reading and recording apparatus comprising:

image reading and recording means for reading and recording image information;

first feed means for feeding an image-bearing sheet with image information recorded thereon to said image reading and recording means;

second feed means for feeding a thermosensitive recording sheet having a support coated with a coloring agent, a color developer and light-absorbing dyes, said recording sheet being capable of producing a color having different densities depending on an amount of thermal energy irradiated on said recording sheet;

an optical laser beam scanning system for scanning said image-bearing sheet and said thermosensitive recording sheet with at least one laser beam of a predetermined wavelength in a main scanning direction while said image-bearing sheet and said thermosensitive recording sheet are fed in an auxiliary scanning direction in said image reading and recording means, to read optical information based on the image information from said image-bearing sheet and to record the image information from said image-bearing sheet on said thermosensitive recording sheet; and photoelectric converting means for converting the optical information read from said image-bearing sheet into an electric signal.

2. An image reading and recording apparatus according to claim 1, wherein said image-bearing sheet is a stimulable phosphor sheet having a phosphor layer for storing radiation image information and emitting light representing the stored radiation image information upon exposure to a stimulating radiation.

3. An image reading and recording apparatus according to claim 2, further comprising erasing means for erasing the stored radiation image information from the stimulable phosphor sheet with erasing light.

4. An image reading and recording apparatus according to claim 1, wherein said optical laser beam scanning system comprises means for emitting the at least one laser beam, the at least one laser beam being absorbed by at least the light-absorbing dyes of said thermosensitive recording sheet.

5. An image reading and recording apparatus according to claim 1, wherein said optical laser beam scanning system comprises a laser beam generator for selectively generating a first wavelength laser beam for scanning said image-bearing sheet and a second wavelength laser beam for scanning said thermosensitive recording sheet.

6. An image reading and recording apparatus according to claim 5, wherein said laser beam generator comprises a laser beam emitting source for emitting the first wavelength laser beam, wavelength converting means for converting the first wavelength laser beam into the second wavelength laser beam, and means for selectively emitting the first and second wavelength laser beams.

7. An image reading and recording apparatus according to claim 6, wherein said wavelength converting means includes a solid-state laser medium movable into and out of an optical path of the first wavelength laser beam.

8. An image reading and recording apparatus according to claim 7, wherein said solid-state laser medium is made of $YVO_4$ doped with neodymium (Nd).

9. An image reading and recording apparatus according to claim 7, wherein said solid-state laser medium includes $YVO_4$ doped with neodymium (Nd) and combined with a KTP element.

10. An image reading and recording apparatus according to claim 5, wherein said laser beam generator comprises a laser beam emitting source for emitting the first wavelength laser beam, first wavelength converting means for converting the first wavelength laser beam into the second wavelength laser beam, second wavelength converting means for converting the first wavelength laser beam into a third wavelength laser beam, and means for selectively emitting the second and third wavelength laser beams.

11. An image reading and recording apparatus according to claim 1, further comprising a filter disposed between said photoelectric converting means and the image-bearing sheet for blocking the at least one laser beam irradiated to the image-bearing sheet and passing the optical information obtained from the image-bearing sheet.

12. An image reading and recording apparatus according to claim 1, further comprising a shutter retractably disposed between said photoelectric converting means and the thermosensitive recording sheet for blocking the at least one laser beam irradiated to said thermosensitive recording sheet.

* * * * *